US008929450B2

(12) United States Patent
Lou et al.

(10) Patent No.: US 8,929,450 B2
(45) Date of Patent: Jan. 6, 2015

(54) TEMPORAL BLOCK MERGE MODE

(75) Inventors: Jian Lou, San Diego, CA (US); Limin Wang, San Diego, CA (US); Yue Yu, San Diego, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 390 days.

(21) Appl. No.: 13/351,682

(22) Filed: Jan. 17, 2012

(65) Prior Publication Data

US 2013/0022117 A1 Jan. 24, 2013

Related U.S. Application Data

(60) Provisional application No. 61/433,010, filed on Jan. 14, 2011.

(51) Int. Cl.
*H04N 7/12* (2006.01)
*H04N 19/51* (2014.01)
*H04N 19/96* (2014.01)

(52) U.S. Cl.
CPC ... *H04N 19/00696* (2013.01); *H04N 19/00969* (2013.01)
USPC ............ 375/240.16; 375/240.13; 375/240.18; 375/240.19; 375/240.24

(58) Field of Classification Search
CPC .................. H04N 19/00763; H04N 19/00533; H04N 19/00727
USPC ............. 375/240.16, 240.13, 240.24, 240.27, 375/240.18
See application file for complete search history.

(56) References Cited

U.S. PATENT DOCUMENTS

2006/0245497 A1* 11/2006 Tourapis et al. ......... 375/240.16
2007/0140352 A1 6/2007 Bhaskaran et al.
2008/0267292 A1* 10/2008 Ito et al. ................... 375/240.16
2010/0220790 A1* 9/2010 Jeon et al. ................ 375/240.16
2010/0290530 A1 11/2010 Huang et al.
2012/0027094 A1 2/2012 Sato et al.

FOREIGN PATENT DOCUMENTS

WO WO2009051419 4/2009

OTHER PUBLICATIONS

M. Winken, et al., "Description of Video Coding Technology Proposal by Fraunhofer HHI", Document # JCTVC-A116, Dresden, Germany, Apr. 2010.
J. Jung, "Core Experiment 9: Motion Vector Coding", Document # JCTVC-C509, Guangzhou, China, Oct. 2010.
Patent Cooperation Treaty, "International Search Report and Written Opinion of the International Searching Authority," for Int'l Application No. PCT/US2012/021606; Mar. 28, 2012.

(Continued)

*Primary Examiner* — Qutbuddin Ghulamali
(74) *Attorney, Agent, or Firm* — Young Basile Hanlon & MacFarlane P.C.

(57) ABSTRACT

In one embodiment, a method includes determining motion parameters for a temporally-located block to a current block of video content. The temporally-located block is located in a different picture from the current block. The temporally-located block is identified in a merge mode candidate list. The merge mode candidate list includes candidate blocks in which motion parameters are candidates to be used for the current block. The method then signals information to a decoder to indicate which motion parameters from a candidate block on the merge mode candidate list to use in decoding the current block. If a temporally-located block is identified, the method uses motion parameters for the temporally-located block in decoding the current block of video content.

25 Claims, 8 Drawing Sheets

(56) References Cited

OTHER PUBLICATIONS

Li S., et al.; "Direct Coding for Bipredictive Slices in the H.264 Standard;" IEEE Transactions on Circuits and Systems for Video Technology; vol. 15; No. 1; pp. 119-126; Jan. 1, 2005.

Winken M., et al., "Video Coding Technology Proposal by Fraunhofer HHI", Document # JCT-VC Meeting, Dresden, Germany, p. 9, Apr. 15, 2010.

* cited by examiner

TEMPORAL BLOCK MERGE MODE

CROSS REFERENCE TO RELATED APPLICATIONS

The present application claims priority to U.S. Provisional App. No. 61/433,010 for "Temporal Block Merge Mode" filed Jan. 14, 2011, the contents of which is incorporated herein by reference in their entirety.

The present application is related to U.S. application Ser. No. 13/251,906 for "Joint Spatial and Temporal Merge Mode for HEVC" and U.S. application Ser. No. 13/351,782 for "Spatial Merge Mode," filed concurrently, the contents of which are incorporated herein by reference in their entirety.

BACKGROUND

Particular embodiments generally relate to video compression.

In video sequences, a great degree of temporal redundancy may exist. That is, within a very short period of time, the shape(s) of foreground object(s) and the background within a picture may not vary very much, and pixels in the foreground objects may move along a similar nature. In object-based video coding, different parts of a picture can be coded and transmitted separately as video objects. Motion information of different pixels in the same object should be the same in some cases. However, many bits still need to be used to describe the arbitrary object shape, which reduces coding efficiency. Thus, the efficient representation of object motion is challenging.

High efficiency video coding (HEVC) is a block-based hybrid spatial and temporal predictive coding scheme. HEVC partitions an input picture into square blocks referred to as largest coding units (LCUs) that could be a size up to 64×64. Theoretically, a larger coding unit is preferred to take advantage of correlation among immediate neighboring pixels. Each LCU can be partitioned into smaller square blocks called coding units (CUs). FIG. 1A shows an example of an LCU partition of CUs. An LCU 100 is first partitioned into four CUs 102. Each CU 102 may also be further split into four smaller CUs 102 that are a quarter of the size of the CU 102. This partitioning process can be repeated based on certain criteria, such as limits to the number of times a CU can be partitioned may be imposed. As shown, CUs 102-1, 102-3, and 102-4 are a quarter of the size of LCU 100. Further, a CU 102-2 has been split into four CUs 102-5, 102-6, 102-7, and 102-8.

To allow for flexible motion representation and higher coding efficiency, a quadtree data representation is used to describe how LCU 100 is partitioned into CUs 102. FIG. 1B shows a quadtree 104 of the LCU partition shown in FIG. 1A. Each node of quadtree 104 is assigned a flag of "1" if the node is further split into four sub-nodes and assigned a flag of "0" if the node is not split. The flag is called a split bit (e.g., 1) or stop bit (e.g., 0) and is coded in a compressed bitstream.

A node 106-1 includes a flag "1" at a top CU level because LCU 100 is split into 4 CUs. At an intermediate CU level, the flags indicate whether a CU 102 is further split into four CUs. In this case, a node 106-3 includes a flag of "1" because CU 102-2 has been split into four CUs 102-5-102-8. Nodes 106-2, 106-4, and 106-5 include a flag of "0" because these CUs 102 are not split. Nodes 106-6, 106-7, 106-8, and 106-9 are at a bottom CU level and hence, no flag bit of "0" or "1" is necessary for those nodes because corresponding CUs 102-5-102-8 are not split. The partitioning process may continue all the way to 4×4 blocks. The quadtree data representation for quadtree 104 shown in FIG. 1B may be represented by the binary data of "10100", where each bit represents a node 106 of quadtree 104. The binary data indicates the LCU partitioning to the encoder and decoder, and this binary data needs to be coded and transmitted as overhead.

Each CU 102 may include one or more prediction units (PUs). The PUs may be used to perform spatial prediction or temporal prediction. FIG. 2 shows an example of a CU partition of PUs 202. As shown, a CU 102 has been partitioned into four PUs 202-1-202-4. Spatial or temporal prediction coding may be performed over each PU 202. In inter-mode, motion parameters are coded and transmitted for each PU. The structure may require many bits for motion information, especially for irregularly shaped objects.

A spatial merge mode may be used to improve coding efficiency. The spatial merge mode may merge a current block with its neighboring block(s) to form a "region". All the pixels within the region share the same motion parameters. Thus, there is no need to code and transmit motion parameters for each individual block of a region. Instead, for a region, only one set of motion parameters is coded and transmitted. The current block is allowed to merge with a spatially-located block that is neighboring the current block to the left or the top. A flag merge_flag is used to specify whether the current block is merged with an available neighboring block. Additionally, a flag merge_left_flag is used to indicate whether the left neighboring block or the top neighboring block should be used in the spatial merge. The spatial merge mode is limited to merging with spatially-located blocks in the same picture.

SUMMARY

In one embodiment, a method includes determining motion parameters for a temporally-located block to a current block of video content. The temporally-located block is located in a different picture from the current block. The temporally-located block is identified in a merge mode candidate list. The merge mode candidate list includes candidate blocks in which motion parameters are candidates to be used for the current block. The method then signals information to a decoder to indicate which motion parameters from a candidate block on the merge mode candidate list to use in decoding the current block.

In one embodiment, a method includes receiving signaling including a merge mode candidate list, the merge mode candidate list identifying candidate blocks in which motion parameters are candidates to be used for the current block; determining which candidate block is identified in the merge mode candidate list for decoding a current block of video content; and if a temporally-located block is identified, using motion parameters for the temporally-located block in decoding the current block of video content, the temporally-located block located in a different picture from the current block.

In one embodiment, an apparatus includes one or more computer processors and a computer-readable storage medium comprising instructions for controlling the one or more computer processors to be operable to: determine motion parameters for a temporally-located block to a current block of video content, the temporally-located block located in a different picture from the current block; identify the temporally-located block in a merge mode candidate list, the merge mode candidate list including candidate blocks in which motion parameters are candidates to be used for the current block; and signal information to a decoder to indicate which motion parameters from a candidate block on the merge mode candidate list to use in decoding the current block.

In one embodiment, an apparatus includes one or more computer processors and a computer-readable storage medium comprising instructions for controlling the one or more computer processors to be operable to: receive signaling including a merge mode candidate list, the merge mode candidate list identifying candidate blocks in which motion parameters are candidates to be used for the current block; determine which candidate block is identified in the merge mode candidate list for decoding a current block of video content; and if a temporally-located block is identified, use motion parameters for the temporally-located block in decoding the current block of video content, the temporally-located block located in a different picture from the current block.

One embodiment includes a method comprising determining a merge mode for a current block of video content, wherein the merge mode is one or more blocks selected from a candidate list, wherein the candidate list comprises at least one of one or more spatially-located neighboring block, and one or more temporally-located neighboring blocks; and signaling information to a decoder to indicate which motion parameters of the at least one selected block to use in decoding the current block, wherein the at least one spatially-located neighboring block resides in the same picture as the current block; and wherein the at least one temporally-located neighboring block resides in a different picture from the current block. The merge mode can be one of a spatially-located neighboring block, a temporally-located neighboring block, a combination of spatially-located blocks, a combination of temporally-located blocks, and a combination of spatially-located and temporally-located blocks of the current block. The method further comprises determining motion parameters for the at least one spatially-located block to the current block of video content, the at least one spatially-located block located in a same picture as the current block; and identifying the at least one spatially-located block in the merge mode candidate list.

In one embodiment, the motion parameters to use in decoding the current block can be from the temporally-located block, the spatially-located block, or a combination of motion parameters from spatially-located blocks to the current block. The signaling can comprise setting information in an index at an encoder to allow the decoder to determine which motion parameters from the candidate block on the merge mode candidate list to use. The identifying can comprise setting a set of flags to indicate which motion parameters from the candidate block on the merge mode candidate list to use. The set of flags can comprise a first flag to indicate whether either of the temporally-located block and a spatially-located block is used, a second flag to indicate whether the temporally-located block is used, and a third flag to indicate which spatially-located block is used.

One embodiment comprises a method including receiving signaling including a merge mode for a current block of video content, wherein the merge mode is one or more blocks selected from a candidate list, wherein the candidate list comprises at least one of one or more spatially-located neighboring block, and one or more temporally-located neighboring blocks; determining which candidate block is identified in the merge mode candidate list for decoding a current block of video content, wherein the at least one spatially-located neighboring block resides in the same picture as the current block; and wherein the at least one temporally-located neighboring block resides in a different picture from the current block. The merge mode can be one of a spatially-located neighboring block, a temporally-located neighboring block, a combination of spatially-located blocks, a combination of temporally-located blocks, and a combination of spatially-located and temporally-located blocks of the current block. In one embodiment, the method further comprises determining motion parameters for the at least one spatially-located block to the current block of video content, the at least one spatially-located block located in a same picture as the current block; and identifying the at least one spatially-located block in the merge mode candidate list, if the spatially-located block is identified in the candidate list for decoding the current block, the method further comprising using motion parameters for the at least one spatially-located block in decoding the current block of video content.

The motion parameters to use in decoding the current block can be from the temporally-located block, the spatially-located block, or a combination of motion parameters from spatially-located blocks to the current block. Determining which candidate block can comprise using an index to determine which motion parameters from the candidate block to use in decoding the current block. Determining which candidate block can comprise using a set of flags to determine which motion parameters from the candidate block to use in decoding the current block.

On embodiment comprises an apparatus including one or more computer processors and a computer-readable storage medium comprising instructions for controlling the one or more computer processors to be operable to determine motion parameters for at least one temporally-located block to a current block of video content, the temporally-located block located in a different picture from the current block, identify the at least one temporally-located block in a merge mode candidate list, the merge mode candidate list including candidate blocks in which motion parameters are candidates to be used for the current block, and encode information to a decoder to indicate which motion parameters from a candidate block on the merge mode candidate list to use in decoding the current block. The apparatus can be further operable to determine motion parameters for at least one spatially-located block to the current block of video content, the at least one spatially-located block located in a same picture as the current block; and identify the at least one spatially-located block in the merge mode candidate list.

In one embodiment, the at least one temporally-located block and the at least one spatially-located block can be included on the merge mode candidate list and information is signaled indicating which motion parameters of the at least one temporally-located block and the at least one spatially-located block to use in decoding the current block. The motion parameters to use in decoding the current block can be from the at least one temporally-located block, the at least one spatially-located block, or a combination of motion parameters from spatially-located blocks to the current block. The signal can comprise set information in an index at an encoder to allow the decoder to determine which motion parameters from the candidate block on the merge mode candidate list to use. In one embodiment, identifying comprises setting a set of flags to indicate which motion parameters from the candidate block on the merge mode candidate list to use. The set of flags can comprise a first flag to indicate whether either of the temporally-located block and a spatially-located block is used, a second flag to indicate whether the temporally-located block is used, and a third flag to indicate which spatially-located block is used.

Yet another embodiment includes an apparatus comprising one or more computer processors, and a computer-readable storage medium comprising instructions for controlling the one or more computer processors to be operable to receive signaling including a merge mode candidate list, the merge mode candidate list identifying candidate blocks in which motion parameters are candidates to be used for the current block, determine which candidate block is identified in the merge mode candidate list for decoding a current block of video content, and if a temporally-located block is identified, use motion parameters for the temporally-located block in decoding the current block of video content, the temporally-located block located in a different picture from the current block. The merge mode candidate list can include at least one spatially-located block to the current block, the at least one spatially-located block located in a same picture as the current block, and if the at least one spatially-located block is identified in the candidate list for decoding the current block, further operable to use motion parameters for the at least one spatially-located block in decoding the current block of video content.

In one embodiment, the motion parameters from candidate blocks in the merge mode candidate list are from the at least one temporally-located block, the at least one spatially-located block or a combination of motion parameters from spatially-located blocks to the current block. Determining which candidate block can comprise using an index to determine which motion parameters from the candidate block to use in decoding the current block. Determining which candidate block can comprise using a set of flags to determine which motion parameters from the candidate block to use in decoding the current block.

The following detailed description and accompanying drawings provide a more detailed understanding of the nature and advantages of the present invention.

DETAILED DESCRIPTION

Described herein are techniques for a video compression system. In the following description, for purposes of explanation, numerous examples and specific details are set forth in order to provide a thorough understanding of embodiments of the present invention. Particular embodiments as defined by the claims may include some or all of the features in these examples alone or in combination with other features described below, and may further include modifications and equivalents of the features and concepts described herein.

Figure 1A:
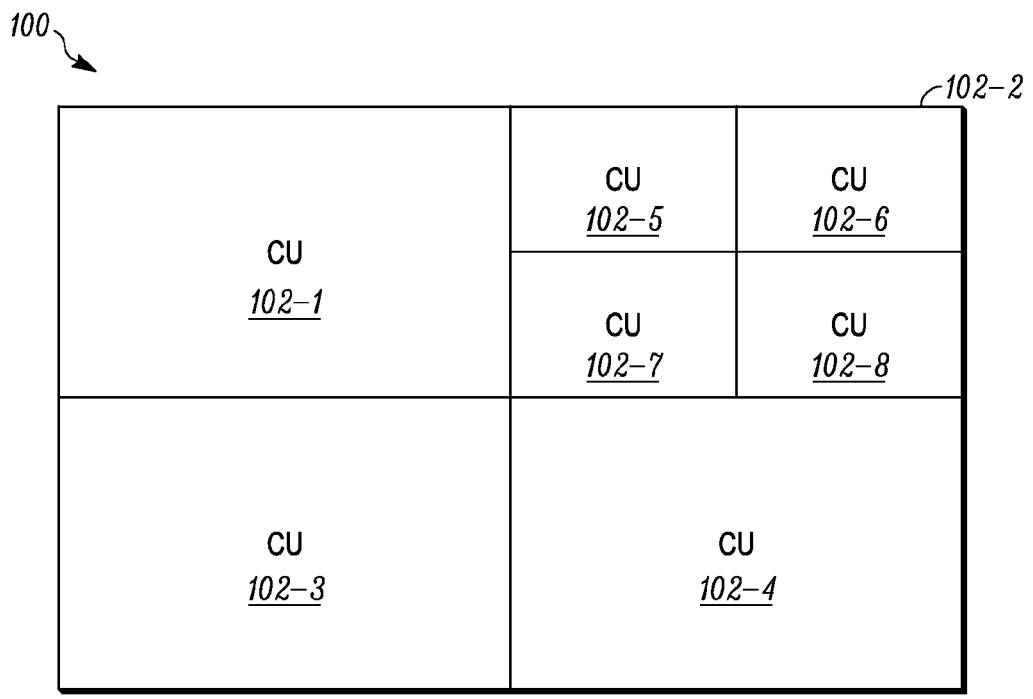
FIG. 1A shows an example of an LCU partition.
Figure 1B:
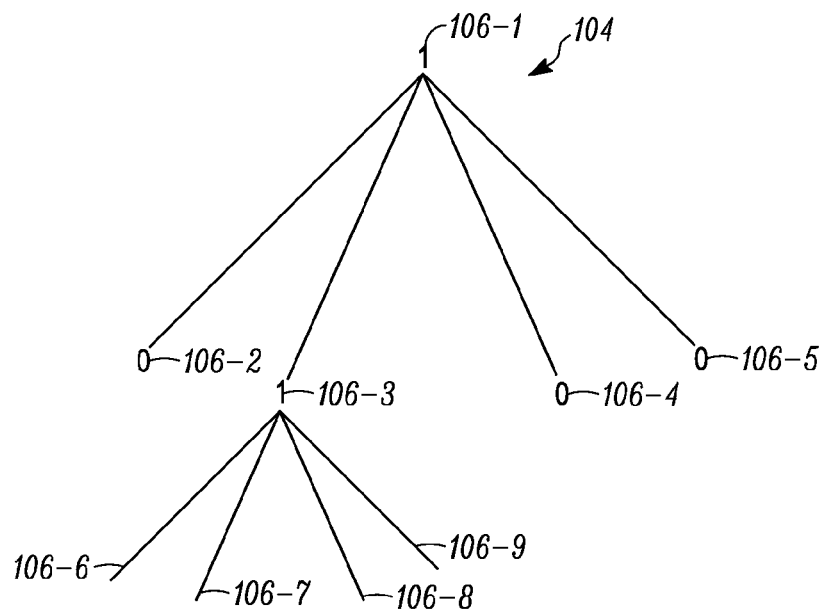
FIG. 1B shows a quadtree of the LCU partition shown in FIG. 1A.
Figure 2:
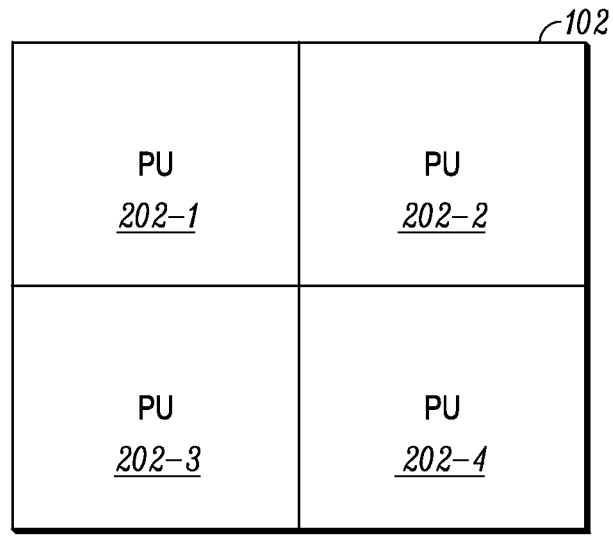
FIG. 2 shows an example of a CU partition of PUs.
Figure 3:
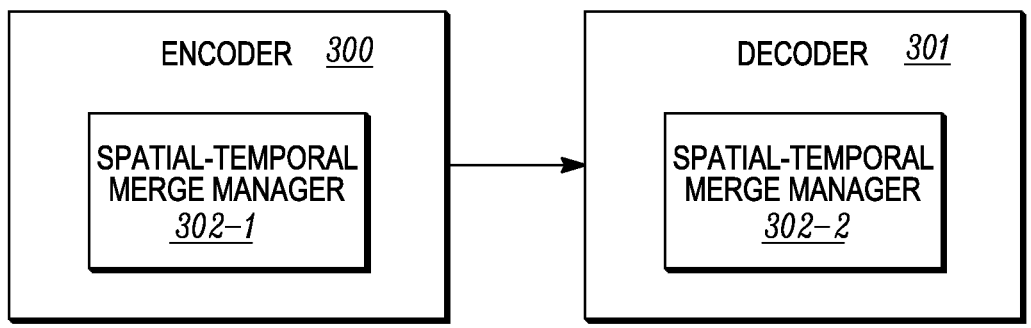
FIG. 3 depicts an example of a system for encoding and decoding video content according to one embodiment.

FIG. 3 depicts an example of a system for encoding and decoding video content according to one embodiment. The system includes an encoder 300 and a decoder 301, both of which will be described in more detail below. Encoder 300 uses a spatial-temporal merge manager 302-1 in an encoding process and decoder 301 uses a spatial-temporal merge manager 302-2 in a decoding process. In one embodiment, encoder 300 and decoder 301 use the HEVC coding scheme.

Each spatial-temporal merge manager 302 allows temporal correlation to be taken into consideration in addition to spatially-located blocks while in a merge mode. That is, given a current block in the merge mode, spatially-located blocks may be used (i.e., a spatial merge mode) in addition to a temporally-located block (i.e., a temporal merge mode) in a merge with the current block. For example, the left and top neighboring blocks may be used as spatially-located blocks, and a block in a previously coded picture, such as a co-located block in another picture (e.g., previously coded picture) to the current block, may be used as temporally-located block. A co-located block may be a block that is in a similar position as the current block in another picture, such as any picture that has been coded before the current block may be used. Blocks in other pictures other than a co-located block may also be used. Motion parameters of the current block may be derived from the spatially-located blocks and used in the spatial merge, and/or from temporally-located blocks and used in the temporal merge.

As in the spatial merge mode, the temporal merge mode may merge a current block with the temporally-located block to form a "region". All the pixels within the region share the same motion parameters. Thus, there is no need to code and transmit motion parameters for the current block. Instead, motion parameters of temporally-located block are used for the current block.

In addition, a current block may conceptually merge with more than one spatially-located block and/or temporally-located block, and use the motion parameters of more than one spatially-located block and/or temporally-located blocks to form its own motion parameters. For example, the current block may conceptually merge with two different spatially-located blocks, and use the motion parameters from the two different spatially-located blocks to form the motion parameters in spatial merge.

The motion parameters (for example, motion vectors) may be scaled according to the temporal difference between the reference picture and the current picture. For example, block A is the current block in picture 3 and it needs to get a reference in picture 2. Block B is the upper block and its motion parameter points to a reference in picture 1. Due to the different reference pictures, the motion parameter of block B needs to be scaled before applied to block A in merge mode.

The temporally-located and spatially-located blocks described above may be identified on a merge mode candidate list. For example, the temporally-located block, the left and top spatially-located blocks, and conceptually combined blocks may be candidates to be merged with a current block. Particular embodiments provide signaling from spatial-temporal merge manager 302-1 to spatial-temporal merge manager 302-2 to indicate with which block the current block is merged. Hence, the decoder will know which block's motion parameters are to be used in decoding the current block. For example, an index may be set and signaled to indicate which block's motion parameters are used. Also, flags may be set and signaled to indicate which block's motion parameters should be used. In one embodiment, a first flag merge_flag is used to indicate whether a current block uses the merge mode. A second flag merge_temporal_flag is used to indicate whether the current block is merged spatially or temporally. A third flag merge_left_flag is used to indicate whether a left neighboring block or a top neighboring block is used if a spatial merge mode is selected. Although these flags are described, other ways of signaling may be used. For example, signaling of which merge mode may not be performed as encoder 300 and decoder 301 may follow a set of rules to determine which merge mode to use. Additionally, other flags may be used.

The temporally-located block may be used to leverage temporal redundancy that may exist in video sequences. That is, the shape of objects may not change to a great degree in a short period of time. Thus, the motion parameters for a temporally-located block may be used with a current block.

Figure 4:
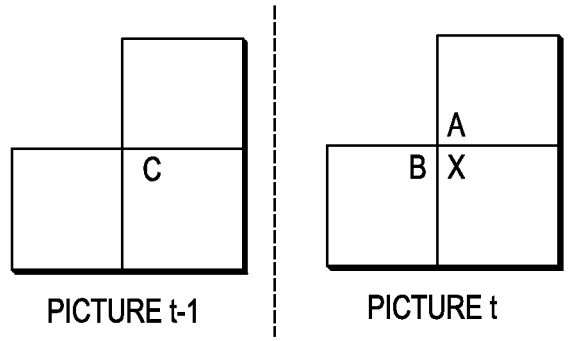
FIG. 4 depicts temporal and spatial neighboring blocks according to one embodiment.

FIGS. 4-8 illustrate the various merging scenarios for spatial-temporal merging according to one embodiment. Which merge mode, either no merge mode, spatial merge mode, or temporal merge mode, to use may be determined in different ways. For example, U.S. application Ser. No. 13/251,906 for "Joint Spatial and Temporal Merge Mode for HEVC" describes different ways of determining which merge mode to use. FIG. 4 depicts temporal and spatial neighboring blocks according to one embodiment. In a picture t, a current block is a block X. Current block X is allowed to spatially merge with a left neighboring block, block B, or a top neighboring block, a block A. Additionally, current block X is allowed to temporally merge with a block C in a different picture t-1. Block C is temporally co-located with current block X. That is, block C is located in a same position as block X, but at a different time. For example, block C may have been coded at a previous time.

Figure 5:
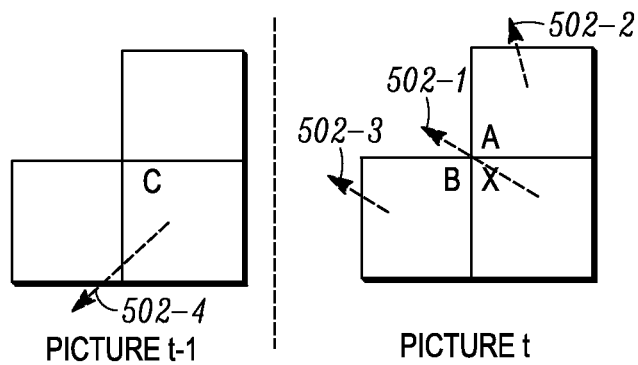
FIG. 5 depicts a scenario when block X is not in any merge mode according to one embodiment.

FIG. 5 depicts a scenario when block X is not in any merge mode according to one embodiment. Motion vectors 502-1, 502-2, and 502-3 are shown for blocks in picture t. A motion vector 502-4 is shown for block C in picture t-1. In this case, the motion parameters, such as the motion vector, need to be coded. Additionally, the motion parameters may be a reference picture index indicating which reference picture is used for prediction. The motion parameters are sent from encoder 300 to decoder 301 in this case.

Figure 6:
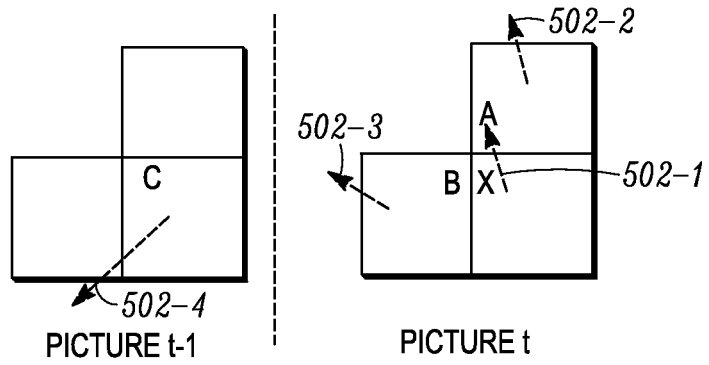
FIG. 6 depicts a scenario when block X is merged with block A in the spatial merge mode according to one embodiment.

FIG. 6 depicts a scenario when block X is merged with block A in the spatial merge mode according to one embodiment. In this case, motion vector 502-1 for block X is the same as motion vector 502-2. Block X is thus spatially merged with block A, which is the top neighboring block. Motion parameters for motion vector 502-1 only need to be coded once in this example for block X and block A. As will be discussed below, flags may be set to indicate that block X is merged with block A.

Figure 7:
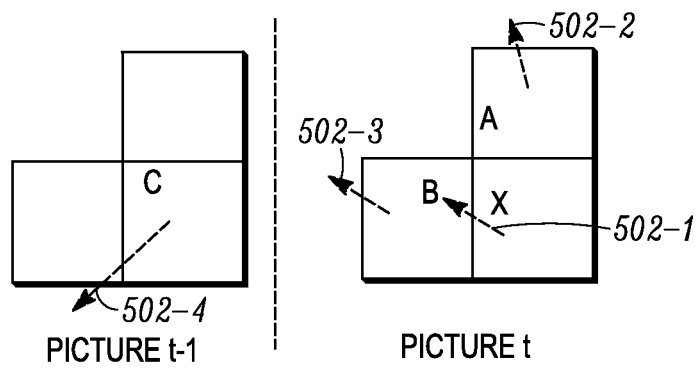
FIG. 7 depicts a scenario when block X is merged with block B in the spatial merge mode according to one embodiment.

FIG. 7 depicts a scenario when block X is merged with block B in the spatial merge mode according to one embodiment. Block B is the left neighboring block to block X, and motion vector 502-1 is the same as motion vector 502-3 for block B. Motion parameters only need to be coded once in this example for block X and block B. That is, the same motion parameters used for block B, such as motion vector 502-3, are used to for block X.

Figure 8:
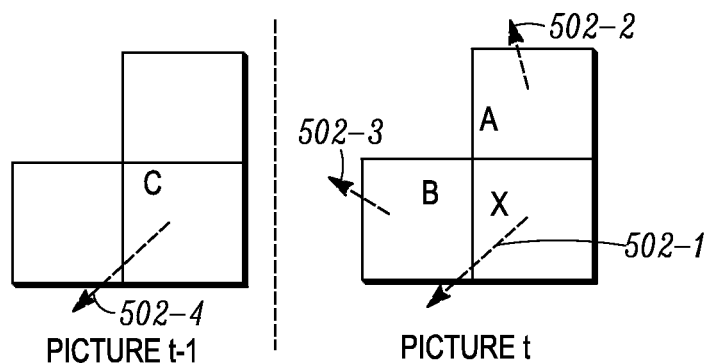
FIG. 8 depicts a scenario when block X is merged with block C in a temporal merge mode according to one embodiment.

FIG. 8 depicts a scenario when block X is merged with block C in a temporal merge mode according to one embodiment. Motion vector 502-1 for block X is the same as motion vector 502-4 for block C. In this case, motion parameters only need to be coded once in this example for block X and block C. For example, motion parameters are not coded for block X, and the motion parameters, such as motion vector 502-4, for block C are used.

Figure 9:
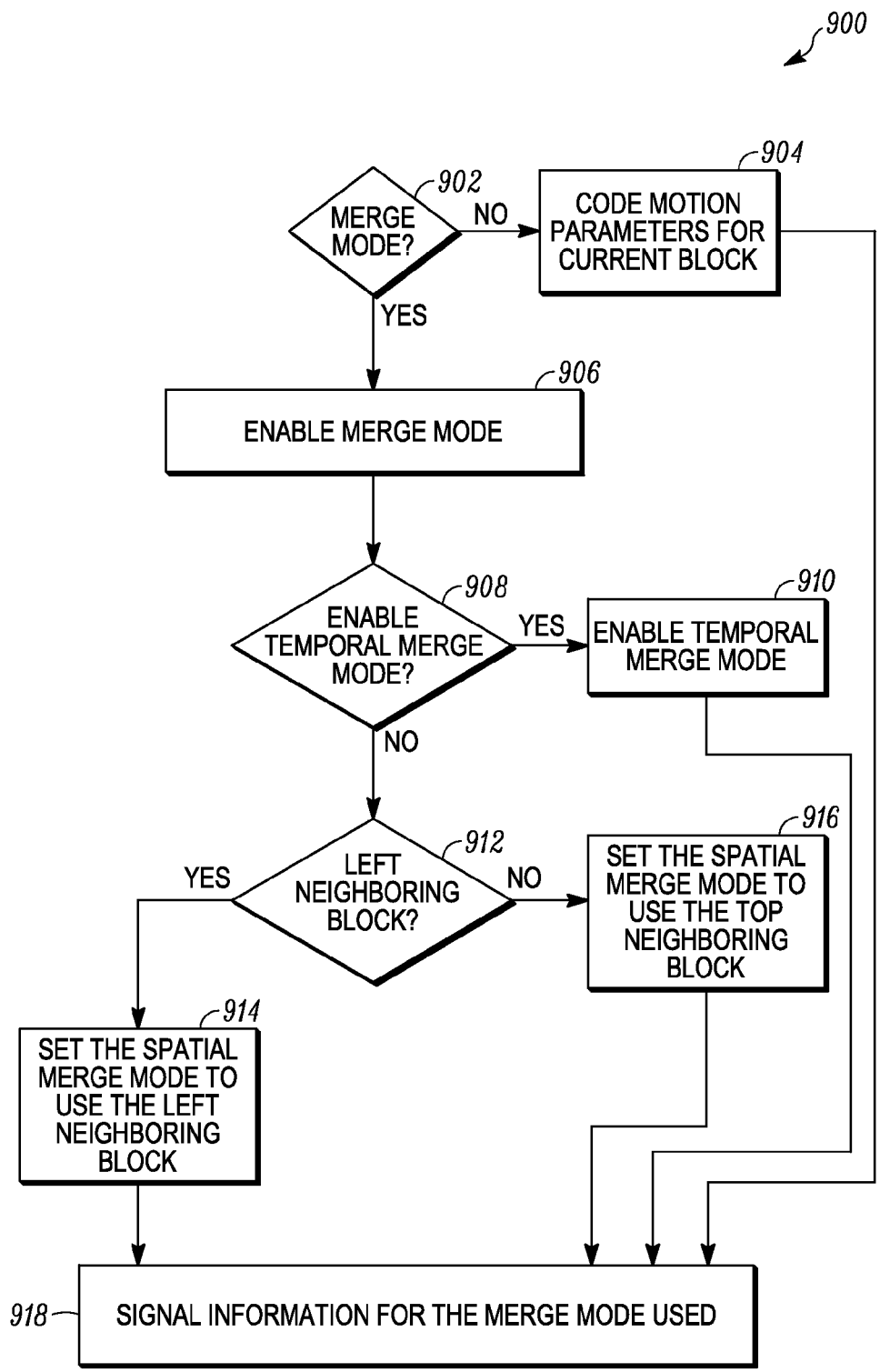
FIG. 9 depicts a simplified flowchart of a method for determining which mode to use in an encoding process according to one embodiment.

Particular embodiments use different ways of signaling which block to use from a merge mode candidate list. In one embodiment, an index may be used. Also, flags, such as three flags merge_flag, merge_temporal_flag, and merge_left_flag, may be used. The following describes the signaling in the encoding and decoding processes. FIG. 9 depicts a simplified flowchart of a method for determining which mode to use in an encoding process according to one embodiment. At 902, spatial-temporal merge manager 302-1 determines if a current block X should be in a merge mode. If not, at 904, motion parameters for block X are coded. This may be the normal coding process for block X. Also, spatial-temporal merge manager 302-1 sets the flag merge_flag to "0" to indicate that the merge mode for the current block X is not enabled. Although the value 0 is used, other values may be used. In another embodiment, information in an index is set to indicate the merge mode is not enabled.

If a merge mode is selected, at 906, spatial-temporal merge manager 302-1 enables the merge mode. For example, spatial-temporal merge manager 302-1 sets the flag merge_flag to a value of "1" to indicate that the merge mode is enabled. Although a value of 1 is described, another value may be used to indicate that the merge mode is enabled. In another embodiment, information in an index is set to indicate the merge mode is enabled.

At 908, spatial-temporal merge manager 302-1 determines if a temporal merge mode should be enabled. If the temporal merge mode should be enabled, at 910, spatial-temporal merge manager 302-1 enables the temporal merge mode. For example, spatial-temporal merge manager 302-1 sets the flag merge_temporal_flag to a value of "1" to indicate that the temporal merge mode should be used. In this case, current block X is merged with a temporally-located block C. In another embodiment, information in an index is set to indicate the temporal merge mode is enabled.

If temporal merge mode is not used, then a spatial merge mode is used. At 912, spatial-temporal merge manager 302-1 determines if a left neighboring block should be used in the spatial merge mode. If the left neighboring block should be used, at 914, spatial-temporal merge manager 302-1 sets the temporal merge mode to use the left neighboring block. For example, spatial-temporal merge manager 302-1 sets the flag merge_left_flag to a value of "1". At 916, if the top neighboring block is to be used in the spatial merge, spatial-temporal merge manager 302-1 sets the flag merge_left_flag to a value of "0" to indicate that the top neighboring block should be merged spatially with block X. Other flags may be used to indicate with blocks other than the left and the top neighboring blocks should be used. In another embodiment, information in an index is set to indicate which of the spatially located blocks should be used.

At 918, spatial-temporal merge manager 302-1 signals information indicating the merge mode used. For example, spatial-temporal merge manager 302-1 signals the values of the flags. In another embodiment, information in an index is signaled. In some embodiments, not all of the values of the flags need to be signaled depending on the merge mode that is used. For example, if the merge mode is not enabled, then a value of "0" for the flag merge_flag may need to be signaled. Encoder 300 also signals the motion parameters for the merged region at least once. Each block in the merged region use the same motion parameters so sending the motion parameters for each block in the region is avoided, which reduces overhead.

Figure 10:
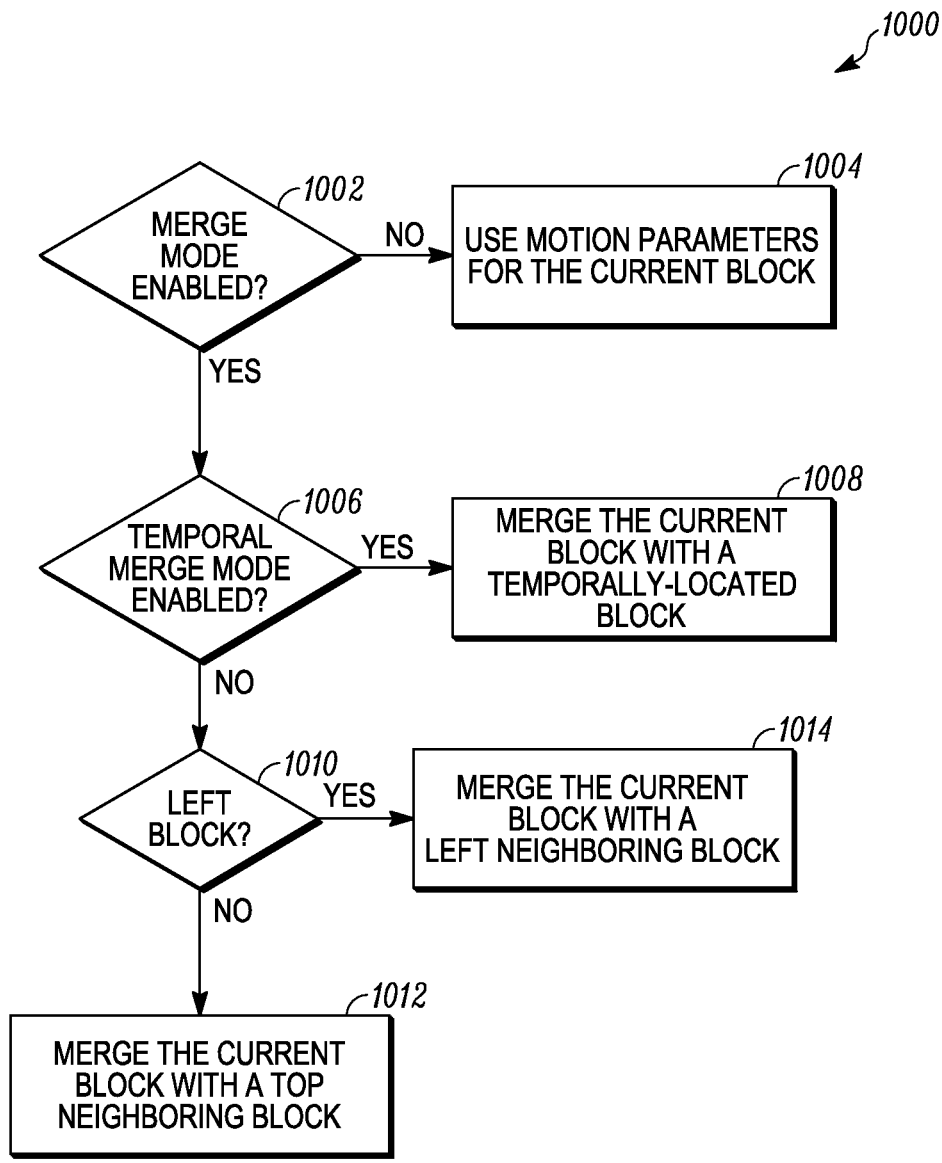
FIG. 10 depicts a simplified flowchart of a method for decoding for a current block according to one embodiment.

FIG. 10 depicts a simplified flowchart 1000 of a method for decoding current block according to one embodiment. At 1002, spatial-temporal merge manager 302-2 determines if the merge mode is enabled for a current block X. For example, spatial-temporal merge manager 302-2 determines if the flag merge_flag is set to a value of "0" to indicate that current block X is not in any merge mode or to a value of "1" to indicate that the current block X is in the merge mode. If the merge mode is not enabled, at 1004, then motion parameters for block X are determined and used in motion prediction at decoder 301. In another embodiment, information in an index is used to determine if the merge mode is or is not enabled.

At 1006, spatial-temporal merge manager 302-2 determines if the temporal merge mode is enabled. For example, if the flag merge_temporal_flag is set to 0, then the current block is merged spatially. In another embodiment, information in an index is used to determine if the temporal merge mode is not enabled. However, if the flag merge_temporal_flag is set to a value of "1", then at 1008, the current block is merged temporally with a temporally-located block. For example, current block X may be merged with a temporally co-located block C. In this case, coding parameters for block C may be used in the motion prediction.

At 1010, if the temporal merge mode is not enabled, spatial-temporal merge manager 302-2 determines which spatially-located block should be used in a spatial merge mode. For example, the flag merge_left_flag may be set to a value of "0" to indicate that a top neighboring block should be used or to a value of "1" to indicate that a left neighboring block should be used. In another embodiment, information in an index is used to determine whether the top or left neighboring block is used. At 1012, if the left neighboring block should not be used, then the current block is merged with a top neighboring block. In this case, coding parameters for the top neighboring block are used in the motion prediction. At 1014, if the left neighboring block should be used, then the current block is merged with a left neighboring block. In this case, coding parameters for the left neighboring block are used in the motion prediction.

Figure 11:
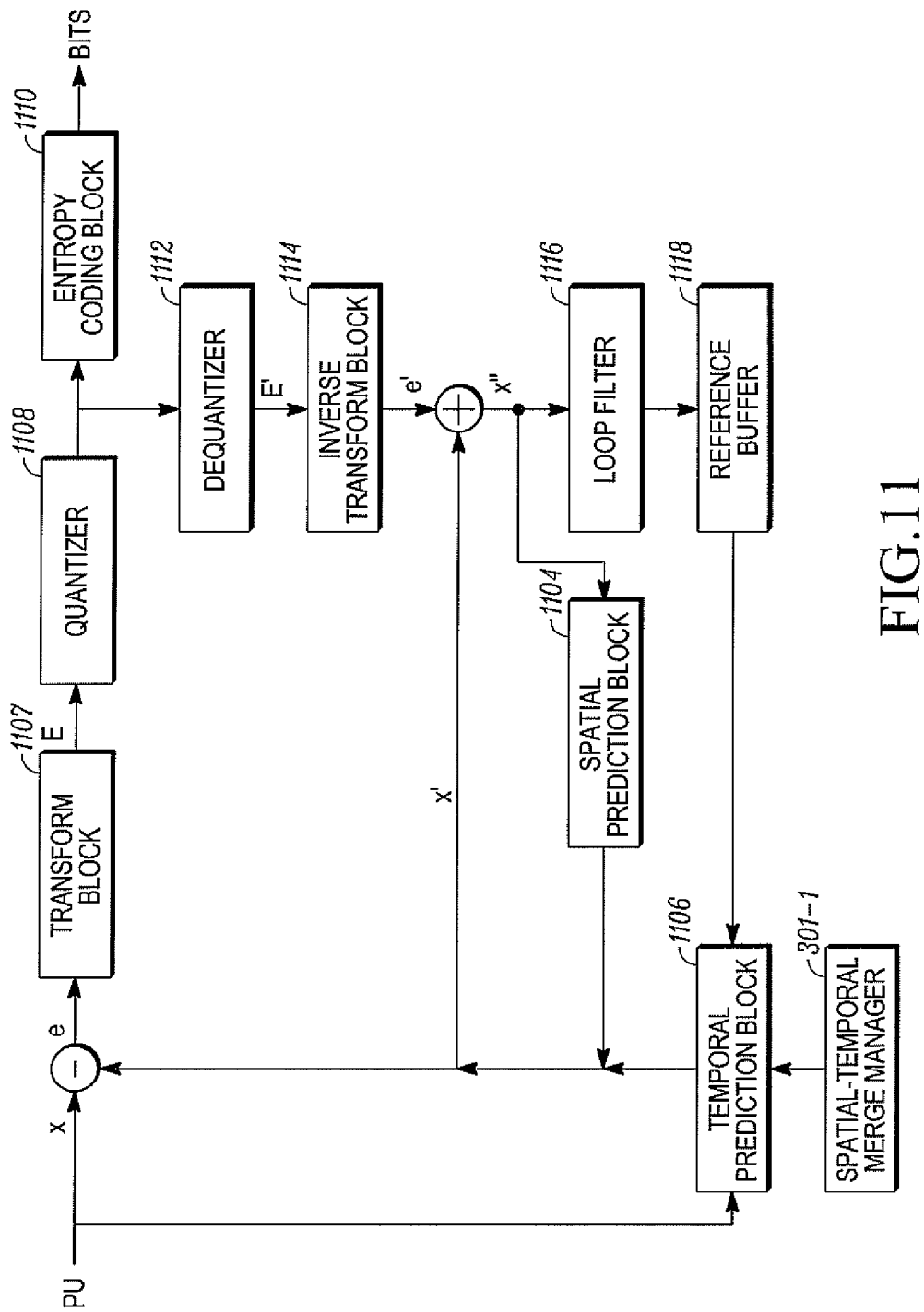
FIG. 11 depicts an example of an encoder according to one embodiment.

FIG. 11 depicts an example of an encoder 300 according to one embodiment. A general operation of encoder 300 will now be described. It will be understood that variations on the encoding process described will be appreciated by a person skilled in the art based on the disclosure and teachings herein.

For a current PU, x, a prediction PU, x', is obtained through either spatial prediction or temporal prediction. The prediction PU is then subtracted from the current PU, resulting in a residual PU, e. A spatial prediction block 1104 may include different spatial prediction directions per PU, such as horizontal, vertical, 45-degree diagonal, 135-degree diagonal, DC (flat averaging), and planar.

A temporal prediction block 1106 performs temporal prediction through a motion estimation and motion compensation operation. The motion estimation operation searches for a best match prediction for the current PU over reference pictures. The best match prediction is described by a motion vector (MV) and associated reference picture (refIdx). The motion vector and associated reference picture are included in the coded bit stream. In motion compensation, a best match prediction for the current PU is determined using the MV and refIdx.

Spatial-temporal merge manager 301-1 may communicate with a temporal prediction block 1106 to perform motion prediction for a current PU. If the current block is merged with a spatially-located block or a temporally-located block, spatial-temporal merge manager 301-1 may signal information indicating which block should be used in decoding the current block. Motion parameters for the current block do not need to be signaled again if the current block is merged spatially or temporally.

Transform block 1107 performs a transform operation with the residual PU, e. Transform block 1107 outputs the residual PU in a transform domain, E.

A quantizer 1108 then quantizes the transform coefficients of the residual PU, E. Quantizer 1108 converts the transform coefficients into a finite number of possible values. Entropy coding block 1110 entropy encodes the quantized coefficients, which results in final compression bits to be transmitted. Different entropy coding methods may be used, such as context-adaptive variable length coding (CAVLC) or context-adaptive binary arithmetic coding (CABAC).

Also, in a decoding process within encoder 300, a de-quantizer 1112 de-quantizes the quantized transform coefficients of the residual PU. De-quantizer 1112 then outputs the de-quantized transform coefficients, E'. An inverse transform block 1114 receives the de-quantized transform coefficients, which are then inverse transformed resulting in a reconstructed residual PU, e'. The reconstructed PU, e', is then added to the corresponding prediction PU, x', either spatial or temporal, to form the new reconstructed PU, x". A loop filter 1116 performs de-blocking on the reconstructed PU, x", to reduce blocking artifacts. Additionally, loop filter 1116 may perform a sample adaptive offset process after the completion of the de-blocking filter process for the decoded picture, which compensates for a pixel value offset between reconstructed pixels and original pixels. Also, loop filter 1116 may perform adaptive filtering over the reconstructed PU, which minimizes coding distortion between the input and output pictures. Additionally, if the reconstructed pictures are reference pictures, the reference pictures are stored in a reference buffer 1118 for future temporal prediction.

Figure 12:
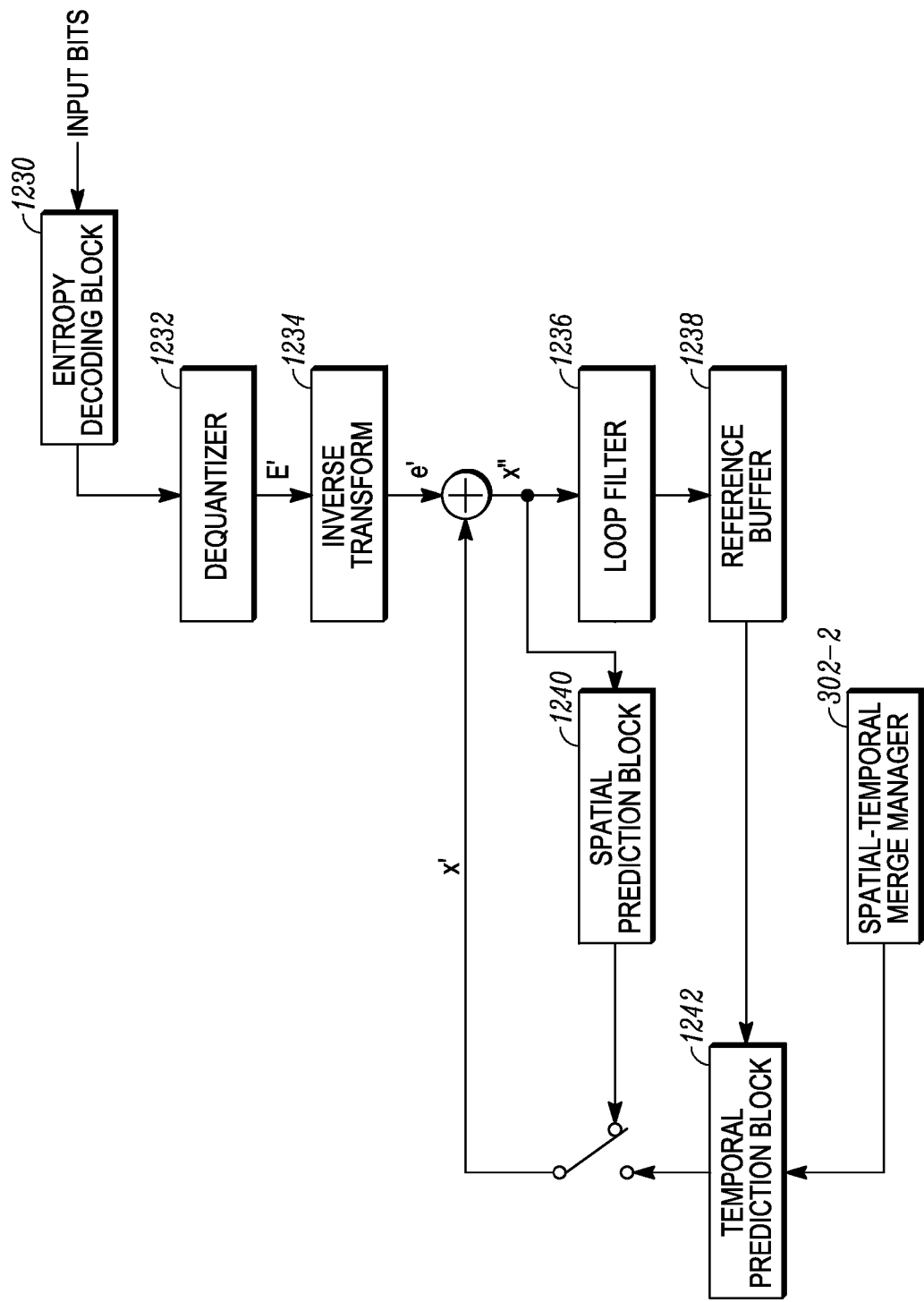
FIG. 12 depicts an example of a decoder according to one embodiment.

FIG. 12 depicts an example of decoder 301 according to one embodiment. A general operation of decoder 301 will now be described. It will be understood that variations on the decoding process described will be appreciated by a person skilled in the art based on the disclosure and teachings herein. Decoder 301 receives input bits from encoder 300 for compressed video content.

An entropy decoding block 1230 performs entropy decoding on input bits corresponding to quantized transform coefficients of a residual PU. A de-quantizer 1232 de-quantizes the quantized transform coefficients of the residual PU. De-quantizer 1232 then outputs the de-quantized transform coefficients of the residual PU, E'. An inverse transform block 1234 receives the de-quantized transform coefficients, which are then inverse transformed resulting in a reconstructed residual PU, e'.

The reconstructed PU, e', is then added to the corresponding prediction, x', either spatial or temporal, to form the new constructed PU, x". A loop filter 1236 performs de-blocking on the reconstructed PU, x", to reduce blocking artifacts. Additionally, loop filter 1236 may perform a sample adaptive offset process after the completion of the de-blocking filter process for the decoded picture, which compensates for a pixel value offset between reconstructed pixels and original pixels. Also, loop filter 1236 may perform an adaptive loop filter over the reconstructed PU, which minimizes coding distortion between the input and output pictures. Additionally, if the reconstructed pictures are reference pictures, the reference pictures are stored in a reference buffer 1238 for future temporal prediction.

The prediction PU, x', is obtained through either spatial prediction or temporal prediction. A spatial prediction block 1240 may receive decoded spatial prediction directions per PU, such as horizontal, vertical, 45-degree diagonal, 135-degree diagonal, DC (flat averaging), and planar. The spatial prediction directions are used to determine the prediction PU, x'.

Temporal prediction block 1242 performs temporal prediction through a motion estimation and motion compensation operation. A decoded motion vector or a motion vector derived from other motion information is then used to determine the prediction PU, x'.

Spatial-temporal merge manager 302-2 receives signaling from spatial-temporal merge manager 302-1 indicating which block's motion parameters to use for the current PU. Spatial-temporal merge manager 302-2 may communicate with temporal prediction block 1242 to indicate whether the current PU should use motion parameters of a spatially-located block or a temporally-located block. For example, decoded motion vector(s) of a temporally-located block may be used or decoded motion vector(s) of a spatially-located block may be used in a temporal prediction.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The instructions, when executed by one or more computer processors, may be operable to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents may be employed without departing from the scope of the invention as defined by the claims.

What is claimed is:

1. A method comprising:
 encoding a plurality of blocks of a first picture and a second picture of a video stream, the second picture temporally after the first picture and each block of at least two of the plurality of blocks encoded by:
  generating a prediction block for the block using a motion vector;
  encoding a difference between the prediction block and the block within a bitstream; and
  encoding the motion vector within the bitstream;
 generating a current prediction block for a current block of the second frame using a current motion vector;
 determining, using the current motion vector, whether or not a merge mode for the current block is enabled;
 upon a condition that the merge mode is not enabled:
  encoding a difference between the current prediction block and the current block within the bitstream; and
  encoding the current motion vector within the bitstream; and
 upon a condition that the merge mode is enabled:
  encoding a difference between the current prediction block and the current block within the bitstream; and
  in place of encoding the current motion vector within the bitstream, signaling information, within the bitstream, to a decoder to indicate which motion vector encoded within the bitstream to use in decoding the current block,
 wherein the information indicates that the motion vector encoded within the bitstream is one of:
  a motion vector used to generate the prediction block for a spatially-located neighboring block, the spatially-located neighboring block being a block of the second picture; or
  a motion vector used to generate the prediction block for a temporally-located neighboring block, the temporally-located neighboring block being a block of the first picture.

2. The method of claim 1, wherein the merge mode results in a common motion vector encoded within the bitstream between the current block and one of a spatially-located neighboring block, a temporally-located neighboring block, a combination of spatially-located blocks, a combination of temporally-located blocks, and a combination of spatially-located and temporally-located blocks of the current block.

3. The method of claim 1, wherein signaling comprises setting information in an index at an encoder to allow the decoder to determine from which of the spatially-located neighboring block or the temporally-located neighboring block to obtain the motion vector.

4. The method of claim 1, wherein signaling comprises setting a set of flags to indicate from which of the spatially-located neighboring block or the temporally-located neighboring block to obtain the motion vector.

5. The method of claim 4, wherein the set of flags comprise a first flag to indicate whether either of the temporally-located neighboring block or the spatially-located neighboring block is used, a second flag to indicate whether the temporally-located neighboring block is used, and a third flag to indicate which block of the second picture is used as the spatially-located neighboring block.

6. The method of claim 1, wherein signaling the information comprises a first flag indicating that the merge mode is enabled, a second flag indicating whether or not the motion vector encoded within the bitstream is the motion vector used to generate the prediction block for the temporally-located neighboring block.

7. The method of claim 6, wherein signaling the information comprises, upon a condition that the second flag indicates that the motion vector encoded within the bitstream is not the motion vector used to generate the prediction block for the temporally-located neighboring block, a third flag indicating which of two temporally-located neighboring blocks provides the motion vector to use in decoding the current block.

8. A method comprising:
 determining a merge mode for a current block of video content, wherein the merge mode is one or more blocks selected from a candidate list, wherein the candidate list comprises at least one of one or more spatially-located neighboring block, and one or more temporally-located neighboring blocks; and
 signaling information to a decoder to indicate which motion parameters of the at least one selected block to use in decoding the current block,
 wherein the at least one spatially-located neighboring block resides in the same picture as the current block,
 wherein the at least one temporally-located neighboring block resides in a different picture from the current block, wherein identifying comprises setting a set of flags to indicate which motion parameters from the candidate block on the merge mode candidate list to use, and wherein the set of flags comprise a first flag to indicate whether either of the temporally-located block and a spatially-located block is used, a second flag to indicate whether the temporally-located block is used, and a third flag to indicate which spatially-located block is used.

9. A method comprising:

receiving an encoded bitstream, the encoded bitstream including a plurality of residual blocks of a first picture and a second picture of the video stream and a plurality of motion vectors used to generate at least some of the residual blocks, the second picture temporally after the first picture;

reproducing a plurality of blocks of the first picture and the second picture by decoding at least some of the plurality of residual blocks, each block of at least two of the plurality of blocks reproduced by:

generating a prediction block for the block using a motion vector of the plurality of motion vectors; and combining the prediction block with a residual block of the plurality of residual blocks to form the block;

receiving, within the encoded bitstream, signaling including a merge mode for a current block of the second frame;

determining which candidate block of a spatially-located neighboring block or a temporally-located neighboring block is identified by the merge mode, wherein the spatially-located neighboring block resides in the second picture and the temporally-located neighboring block resides in the first picture; and decoding the current block by:

generating a current prediction block for the current block using a motion vector encoded within the bitstream in association with the candidate block; and combining the current prediction block with a residual block of the plurality of residual blocks that is associated with the current block to form the current block.

10. The method of claim 9, wherein the merge mode results in a common motion vector encoded within the bitstream between the current block and one of a spatially-located neighboring block, a temporally-located neighboring block, a combination of spatially-located blocks, a combination of temporally-located blocks, and a combination of spatially-located and temporally-located blocks of the current block.

11. The method of claim 9, wherein determining which candidate block comprises using an index to determine from which of the temporally-located neighboring block or the spatially-located neighboring block to obtain the motion vector to use in decoding the current block.

12. The method of claim 9, wherein determining which candidate block comprises using a set of flags to determine from which of the temporally-located neighboring block or the spatially-located neighboring block to obtain the motion vector to use in decoding the current block.

13. The method of claim 9, wherein determining which candidate block of the spatially-located neighboring block or the temporally-located neighboring block is identified by the merge mode comprises:

inspecting a first flag indicating whether or not the candidate block is the temporally-located neighboring block; and only if the first flag indicates that the candidate block is not the temporally-located neighboring block, inspecting a second flag indicating which of at least two spatially-located neighboring blocks is the candidate block.

14. An apparatus comprising:

one or more computer processors; and a non-transitory computer-readable storage medium comprising instructions for controlling the one or more computer processors to:

determine a motion vector for a temporally-located neighboring block to a current block of a current picture, the temporally-located neighboring block located in a different picture from the current picture, the current picture temporally after the different picture;

determine a prediction block for the temporally-located neighboring block using the motion vector;

encode the temporally-located neighboring block and the motion vector within a bitstream;

determine a current motion vector for the current block;

identify the temporally-located neighboring block in a merge mode candidate list, the merge mode candidate list including candidate blocks in which motion vectors are candidates to be used for decoding the current block;

encode the current block within the bitstream using the current motion vector; and instead of encoding the current motion vector, and based on values of the current motion vector and the candidate motion vectors, encode a merge mode within the bitstream for transmission to a decoder to indicate from which candidate block to obtain a decoded motion vector for decoding the current block.

15. The apparatus of claim 14, further operable to:

determine a motion vector for a spatially-located neighboring block to the current block, the spatially-located neighboring block located in the current picture;

determine a prediction block for the spatially-located neighboring block using the motion vector;

encode the spatially-located neighboring block and the motion vector within a bitstream; and identify the spatially-located neighboring block in the merge mode candidate list.

16. The apparatus of claim 15, wherein a set of flags comprises a first flag to indicate whether either of the temporally-located block and a spatially-located block is used, a second flag to indicate whether the temporally-located block is used, and a third flag to indicate which spatially-located block is used.

17. The apparatus of claim 14, wherein the one or more computer processors is configured to encode the merge mode by signaling an index that indicates the candidate block to the decoder.

18. The apparatus of claim 14, wherein the one or more computer processors is configured to set a set of flags that indicates the candidate block to the decoder.

19. The apparatus of claim 14, wherein the one or more computer processors is configured to encode the merge mode by:

inserting a value for a first flag indicating that the merge mode is enabled;

inserting a value for a second flag indicating whether or not the temporally-located neighboring block in the merge mode candidate list is the candidate block from which the decoded motion vector is to be obtained; and upon a condition that the second flag indicates that the temporally-located neighboring block is not the candidate block, inserting a value for a third flag indicating which of a plurality of spatially-located neighboring blocks in the merge mode candidate list is the candidate block from which the decoded motion vector is to be obtained.

20. An apparatus comprising:
one or more computer processors; and
a non-transitory computer-readable storage medium comprising instructions for controlling the one or more computer processors to:
receive an encoded bitstream, the encoded bitstream including a plurality of residual blocks of a first picture and a second picture of the video stream and a plurality of motion vectors used to generate at least some of the residual blocks, the second picture temporally after the first picture;
reproduce a plurality of blocks of the first picture and the second picture by decoding at least some of the plurality of residual blocks, each block of at least two of the plurality of blocks reproduced by:
generating a prediction block for the block using a motion vector of the plurality of motion vectors; and
combining the prediction block with a residual block of the plurality of residual blocks to form the block;
receive, within the encoded bitstream, signaling including a merge mode for a current block;
determine which candidate block of a spatially-located neighboring block or a temporally-located neighboring block is identified by the merge mode wherein the spatially-located neighboring block resides in the second picture and the temporally-located neighboring block resides in the first picture; and
upon a condition that the temporally-located neighboring block is identified, decode the current block by:
generating a current prediction block for the current block using a motion vector encoded within the bitstream in association with the temporally-located neighboring block; and
combining the current prediction block with a residual block of the plurality of residual blocks that is associated with the current block to form the current block.

21. The apparatus of claim 20, wherein the one or more computer processors is configured to, upon a condition that the spatially-located neighboring block is identified, decode the current block by:
generating the current prediction block for the current block using a motion vector encoded within the bitstream in association with the spatially-located neighboring block; and
combining the current prediction block with the residual block of the plurality of residual blocks that is associated with the current block to form the current block.

22. The apparatus of claim 20, wherein the one or more computer processors is configured to determine which candidate block is identified using an index.

23. The apparatus of claim 22, wherein the index is a reference picture index identifying one of the spatially-located neighboring block or the temporally-located neighboring block.

24. The apparatus of claim 20, wherein the one or more computer processors is configured to determine which candidate block is identified using a set of flags.

25. The apparatus of claim 24, wherein the set of flags includes a first flag indicating that the merge mode is enabled, a second flag indicating whether or not the temporally-located neighboring block is to be identified and, upon a condition that the second flag indicates that the temporally-located neighboring block is not to be identified, a third flag indicating that the spatially-located neighboring block is to be identified.

* * * * *